(12) United States Patent
Raghavan et al.

(10) Patent No.: US 9,369,408 B1
(45) Date of Patent: Jun. 14, 2016

(54) HIGH PERFORMANCE AND RESILIENCE IN WIDE AREA NETWORKING

(71) Applicant: Google Inc., Mountain View, CA (US)

(72) Inventors: Barath Raghavan, Berkeley, CA (US); Subhasree Mandal, San Jose, CA (US); Mohammad Alfares, San Francisco, CA (US); John Mccullough, Mountain View, CA (US); Fei Ye, Mountain View, CA (US); Min Zhu, Palo Alto, CA (US); Aravind Ravisankar, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 14/176,625

(22) Filed: Feb. 10, 2014

Related U.S. Application Data

(60) Provisional application No. 61/934,539, filed on Jan. 31, 2014.

(51) Int. Cl.
*G01R 31/08* (2006.01)
*H04L 12/939* (2013.01)
*H04L 12/26* (2006.01)

(52) U.S. Cl.
CPC .......... *H04L 49/557* (2013.01); *H04L 43/0829* (2013.01)

(58) Field of Classification Search
CPC ..................................................... H04L 45/74
USPC ........... 370/230–339, 389–468; 709/238–253
See application file for complete search history.

(56) References Cited

U.S. PATENT DOCUMENTS

| | | | |
|---|---|---|---|
| 5,093,824 | A | 3/1992 | Coan et al. |
| 5,678,006 | A | 10/1997 | Valizadeh et al. |
| 6,104,696 | A | 8/2000 | Kadambi et al. |
| 7,248,565 | B1 | 7/2007 | Fourie |
| 7,751,329 | B2 | 7/2010 | Lapuh et al. |
| 2003/0097470 | A1 | 5/2003 | Lapuh et al. |
| 2003/0108063 | A1 | 6/2003 | Joseph et al. |
| 2009/0219836 | A1 | 9/2009 | Khan et al. |

(Continued)

OTHER PUBLICATIONS

"Software-Defined Networking: The New Norm for Networks", Apr. 13, 2012, ONF White Paper, Open Networking Foundation, 2275 E. Bayshore Road, Suite 103, Palo Alto, CA 94303, 12 pages.

(Continued)

*Primary Examiner* — Iqbal Zaidi
(74) *Attorney, Agent, or Firm* — Edward A. Gordon; Foley & Lardner LLP (57) ABSTRACT

Aspects and implementations of the present disclosure generally relate to use of a multi-chassis link aggregation for high performance and resilience in wide-area networking. In one aspect, the disclosure relates to a system that includes a switch fabric. The fabric includes at least a plurality of edge network devices, a set of internal switch devices, and a plurality of internal network links coupling each edge network device to at least a subset of the set of internal switch devices. The system includes a network controller coupled to the switch fabric, configured to maintain at least one link aggregation comprising a logical grouping of externally facing network interfaces of at least two of the plurality of edge devices. The network controller is configured to monitor internal link performance characteristics and determine throughput characteristics for each link aggregation over time based at least in part on current internal link performance characteristics.

20 Claims, 6 Drawing Sheets

(56) References Cited

U.S. PATENT DOCUMENTS

| | | | |
|---|---|---|---|
| 2012/0275297 | A1 | 11/2012 | Subramanian |
| 2013/0028135 | A1* | 1/2013 | Berman .................. 370/254 |
| 2013/0100854 | A1 | 4/2013 | Tatikonda et al. |
| 2014/0119193 | A1* | 5/2014 | Anand et al. .................. 370/237 |

OTHER PUBLICATIONS

Al-Fares, Mohammad et al., "A Scalable, Commodity Data Center Network Architecture", SIGCOMM'08, Aug. 17-22, 2008, Seattle, WA, 12 pages.

Cardwell, Richard H. et al., "Computer-Aided Design Procedures for Survivable Fiber Optic Networks", IEEE Journal on Selected Areas in Communications, vol. 7, No. 8, Oct. 1989, 10 pages.

Das, Saurav, et al. "Application-aware aggregation and traffic engineering in a converged packet-circuit network", Optical Fiber Communication Conference and Exposition (OFC/NFOEC), 2011 and the National Fiber Optic Engineers Conference. IEEE, 2011, 3 pages.

Engel, Thomas et al., "Advances in QoS, AQUILA: Adaptive Resource Control for QoS Using an IP-Based Layered Architecture", IEEE Communications Magazine, Jan. 2003, 9 pages.

Godfrey, P. Brighten, "Pathlet Routing", SIGCOMM '09, Aug. 17-19, 2009, Barcelona, Spain, 12 pages.

Jain, Sushant et al., "B4: Experience with a Globally-Deployed Software Defined WAN", SIGCOMM'13, Aug. 12-16, 2013, Hong Kong, China, 12 pages.

Krutov, Ilya et al.,"IBM Flex System Networking in an Enterprise Data Center", IBM Corp., ibm.com/redbooks, Redpaper, 2013, 106 pages.

Scharf, Michael, et al., "Monitoring and abstraction for networked clouds", Intelligence in Next Generation Networks (ICIN), 2012 16th International Conference on. IEEE, 2012, 6 pages.

Van't Spijker, Rick, "Multiple Systems Link Aggregation Control Protocol", Dissertation Module for Master of Science—Mobile and Distributed Computer Networks, Leeds Metropolitan University, Innovation North, May 31, 2010, 78 pages.

* cited by examiner

HIGH PERFORMANCE AND RESILIENCE IN WIDE AREA NETWORKING

CROSS-REFERENCE TO RELATED APPLICATIONS

This application claims priority to U.S. Provisional Application No. 61/934,539, filed Jan. 31, 2014, and titled "High Performance and Resilience in Wide Area Networking," the entirety of which is incorporated herein by reference.

BACKGROUND

Communication and data networks generally include a variety of network devices or nodes connected by various links. Each link connects a pair of network devices and enables exchange of information between them. In some networks, multiple links between a pair of nodes are treated as a single logical link, referred to as a "trunk" or link aggregation ("LAG").

A software-defined network ("SDN") is a set of network devices in a data network that includes at least one network device that relies on a separate controller for configuration information such as updates to tables for routing network traffic.

SUMMARY

In one aspect, the disclosure relates to a system. The system includes a switch fabric that includes at least a plurality of edge network devices, each having a plurality of externally facing network interfaces and a plurality of internally facing network interfaces, a set of internal switch devices, and a plurality of internal network links coupling each edge network device to at least a subset of the set of internal switch devices. The system also includes a network controller coupled to switch fabric, the network controller configured to maintain at least one link aggregation (LAG) comprising a logical grouping of externally facing network interfaces of at least two of the plurality of edge devices. The network controller is configured to monitor internal link performance characteristics and determine throughput characteristics for each LAG over time based at least in part on current internal link performance characteristics. In some implementations, the network controller is further configured to publish the determined throughput characteristics for each LAG.

In one aspect, the disclosure relates to a method. The method includes maintaining, by a network controller coupled to a switch fabric, at least one link aggregation (LAG) comprising a logical grouping of externally facing network interfaces of at least two of a plurality of edge devices in the switch fabric. The method includes monitoring, by the network controller, internal link performance characteristics for internal network links coupling the plurality of edge devices to internal switch devices and determining, by the network controller, throughput characteristics for each LAG over time based at least in part on current internal link performance characteristics. In some implementations, the method includes publishing, by the network controller, the determined throughput characteristics for each LAG.

In one aspect, the disclosure relates to tangible computer readable storage media storing non-transient processor-executable instructions that, when executed by a computing device comprising the storage media and one or more processors, cause the one or more processors to perform the operations of maintaining at least one link aggregation (LAG) comprising a logical grouping of externally facing network interfaces of at least two of a plurality of edge devices in a switch fabric. The instructions cause the one or more processors to perform the operations of monitoring internal link performance characteristics for internal network links coupling the plurality of edge devices to internal switch devices, and determining throughput characteristics for each LAG over time based at least in part on current internal link performance characteristics. In some implementations, the instructions cause the one or more processors to publish, the determined throughput characteristics for each LAG.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Aspects and implementations of the present disclosure generally relate to use of a multi-chassis link aggregation (a "LAG") for high performance and resilience in wide-area networking. A LAG is an aggregation of parallel data links between two end nodes. That is, a LAG is a logical grouping of links, or of the network interfaces to those links, such that the logical grouping acts as a single, higher capacity, link. In a multi-chassis LAG between nodes, at least one end node is a multi-chassis node that includes multiple edge switches with externally facing network interfaces that each serve as physical termination points for respective parallel links of the LAG. The multi-chassis node may also include internal network switches that participate in data connections between edge switches. When there are failures at edge switches or internal switches, or failures in the links there-between, the overall capacity of the multi-chassis LAG is impaired.

Figure 1:
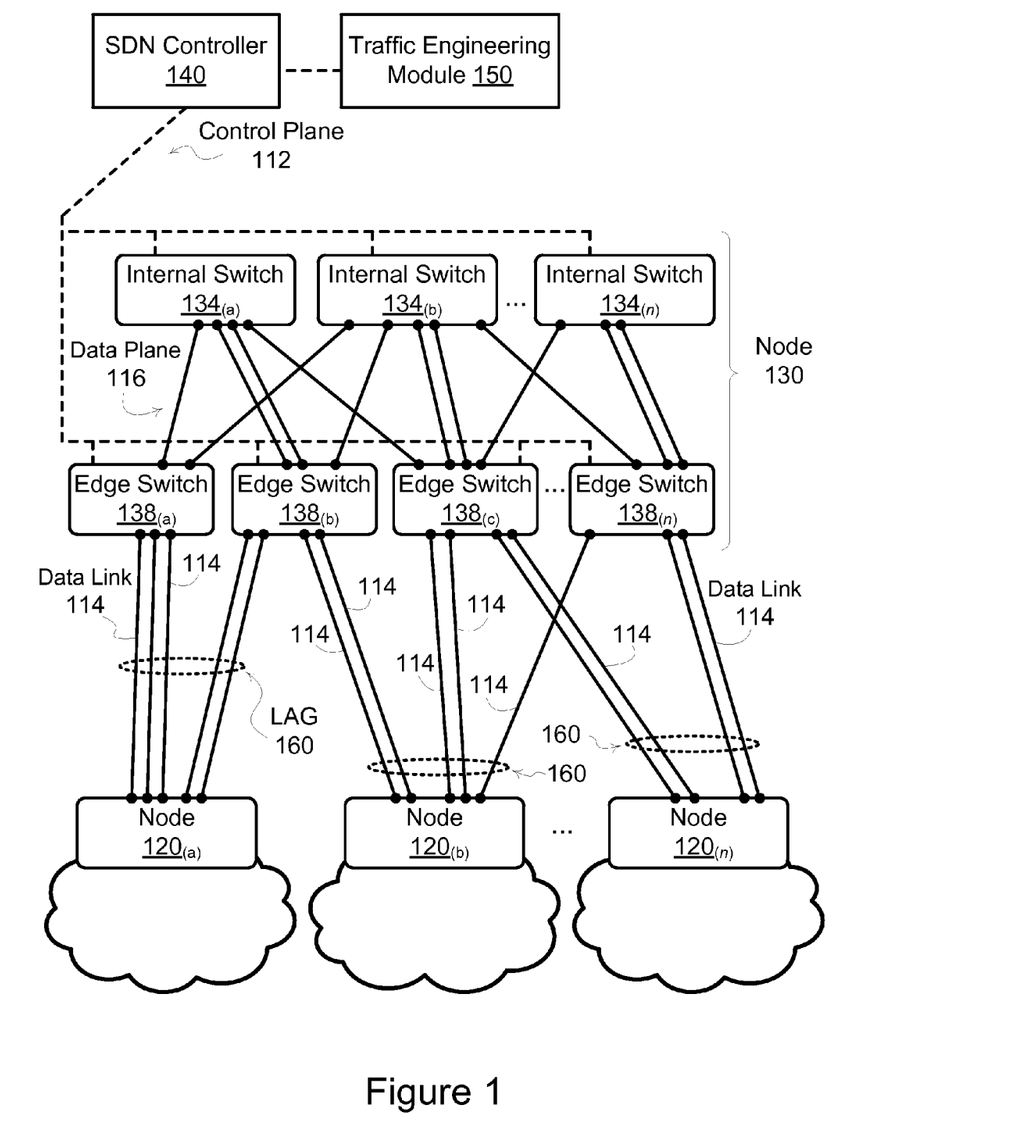
FIG. 1 is a block diagram of an example software-defined network.

FIG. 1 is a block diagram of an example network. As illustrated, a multi-chassis node 130 includes multiple internal switches $134_{(a)}$-$134_{(n)}$, multiple edge switches $138_{(a)}$-$138_{(n)}$, and internal links connecting the various internal switches $134_{(a)}$-$134_{(n)}$ and edge switches $138_{(a)}$-$138_{(n)}$ to form a data plane 116. The internal switches $134_{(a)}$-$134_{(n)}$ are referred to herein, generally, as internal switches 134, and the edge switches $138_{(a)}$-$138_{(n)}$ are referred to herein, generally, as edge switches 138. Each edge switch 138 of the multi-chassis node 130 has externally facing network interfaces for data links 114 to other nodes $120_{(a)}$-$120_{(n)}$ (referred to herein, generally, as external nodes 120). The data links 114 are aggregated into different LAGs 160. Each LAG 160 includes data links 114 to two or more edge switches 138, such that if one edge switch 138 failed there is still a data path through the LAG 160 and the multi-chassis node 130.

Figure 6:
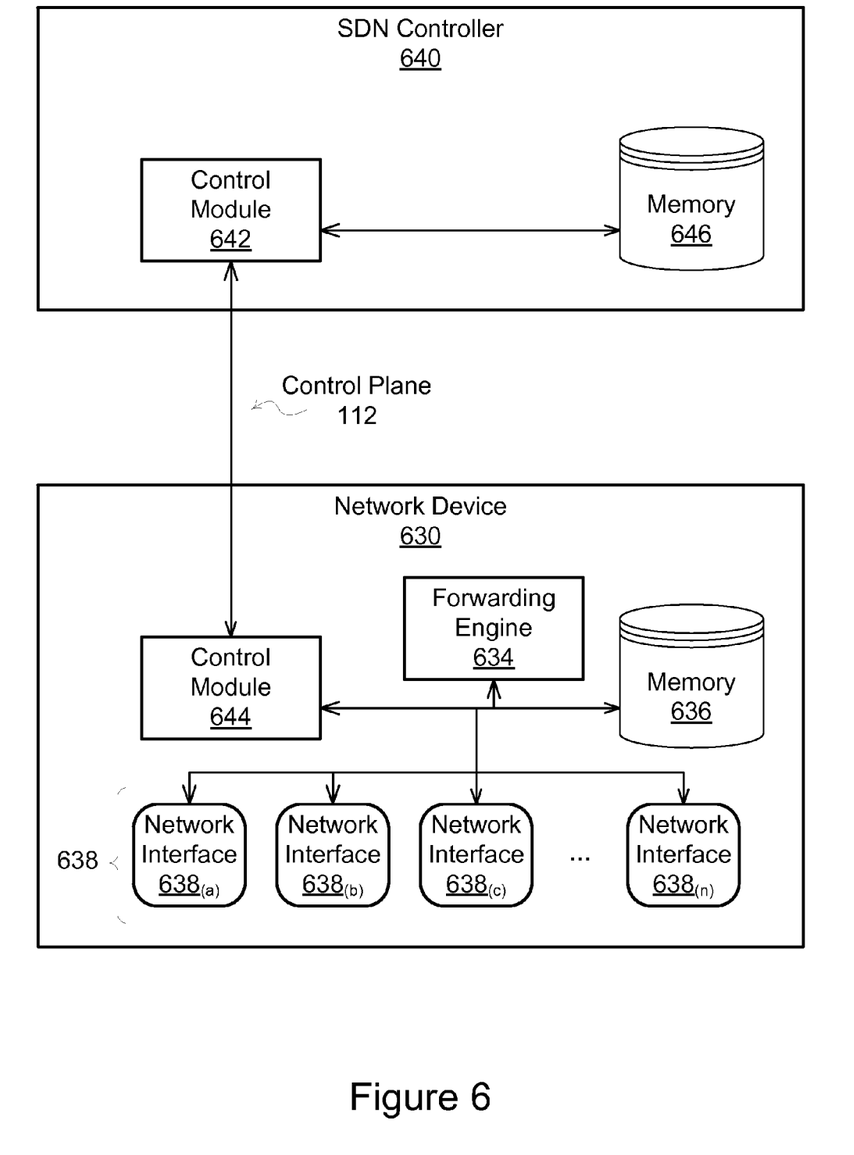
FIG. 6 is a block diagram of an example software-defined network controller and network device separated by a control plane link.
Figure 7:
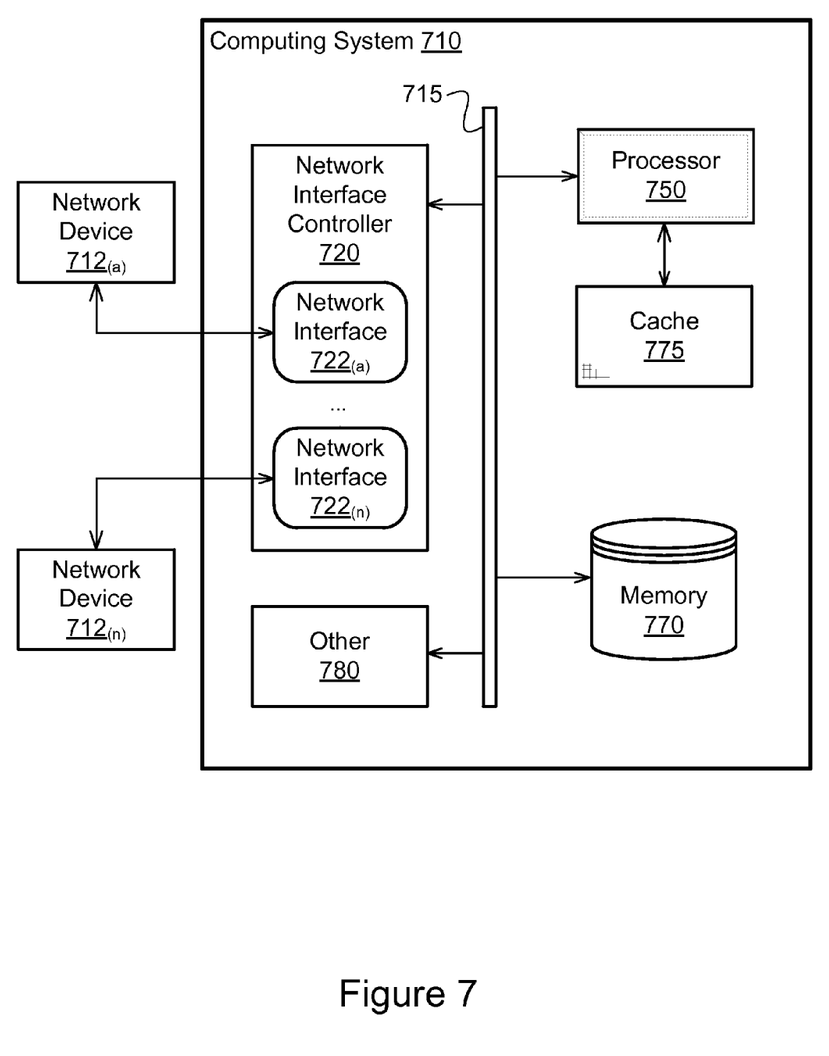
FIG. 7 is a block diagram of a computing system in accordance with an illustrative implementation.

The multi-chassis node 130 is part of a software-defined network ("SDN"). Generally, an SDN is a data network in which some or all of the network devices in the network are controlled by a separate SDN controller. In FIG. 1, the SDN controller 140 controls the internal switches $134_{(a)}$-$134_{(n)}$ and edge switches $138_{(a)}$-$138_{(n)}$ via a control plane 112. In some implementations, the SDN controller 140 operates collaboratively with a traffic engineering module 150 to determine flow routes, flow rates, and flow limits through the multi-chassis node 130 and any larger network to which the multi-chassis node may be connected. FIG. 6, described below, illustrates an example SDN controller linked to an example network device. FIG. 7, described below, illustrates an example computing system or network device. Referring still to FIG. 1, each internal switch 134 and each edge switch 138 is a network device with multiple network interfaces, in accordance with the computing device illustrated in FIG. 7.

Referring to FIG. 1, in more detail, the multi-chassis node 130 is one end of a LAG 160 linking the multi-chassis node 130 to an external node 120. The LAG 160 is an aggregation of data links 114 between the external node 120 and one or more edge switches $138_{(a)}$-$138_{(n)}$ of the multi-chassis node 130. The multi-chassis node 130 may participate in multiple LAGs 160. Each data link 114 may be any form of data link, including (but not limited) to links employing copper wire, coaxial cable, optical fiber, radio waves, or satellites. Each data link 114 has characteristics. Link characteristics may include, for example, bandwidth capacity, latency, data loss rate, signal stability, and/or operational state (operational as compared to non-operational or failed). The data links 114 may be aggregated together into a LAG 160 according to any link aggregation protocol, e.g., the Link Aggregation Control Protocol (LACP). In some implementations, the link aggregation protocol is maintained by the SDN controller 140. The data links 114 of a LAG 160 may connect an external node 120 to multiple edge switches $138_{(a)}$-$138_{(n)}$ of the multi-chassis node 130. For example, the LAG 160 from external node 120 is a logical grouping of data links 114 to three edge switches $138_{(b)}$, $138_{(c)}$, and $138_{(n)}$. In some implementations, there are multiple links between an external node 120 and a single edge switch 138.

As shown in FIG. 1, the multi-chassis node 130 can participate in multiple LAGs 160. For example, an external node $120_{(a)}$ may have a first LAG 160 to the multi-chassis node 130, and another external node $120_{(n)}$ may have a second LAG 160 to the multi-chassis node 130. The two external nodes $120_{(a)}$ and $120_{(n)}$ exchange information via their respective LAGs 160 and the multi-chassis node 130. The information exchanged may traverse multiple data links 114 and multiple edge switches $138_{(a)}$-$138_{(n)}$. The information exchanged is passed from one edge switch 138 to another edge switch 138 via an internal data plane 116 of the multi-chassis node 130.

The internal data plane 116 connects ach of the edge switches $138_{(a)}$-$138_{(n)}$ to one or more internal switches $134_{(a)}$-$134_{(n)}$ by one or more data links. In some implementations, the data plane 116 is a switched network fabric. Data packets are propagated through the data plane 116 between the edge switches 138 and the internal switches 134. Generally, the data packets may participate in a flow of data packets between any two of the external nodes 120. For example, a data packet may arrive from an external node $120_{(a)}$ at a first edge switch $138_{(a)}$, be forwarded to an internal switch $134_{(b)}$, and subsequently forwarded to a second edge switch $138_{(c)}$ for egress to another external node $120_{(b)}$. In some examples, a route could have multiple hops, e.g., from a first edge switch $138_{(a)}$, to a first internal switch $134_{(a)}$, to a second edge switch $138_{(b)}$, to another internal switch $134_{(n)}$, eventually reaching an edge switch $138_{(n)}$ for egress. This may occur, for example, if there are no shorter routes, if there is a failure, or if it helps in distributing load. In some other examples, a data packet may arrive from an external node $120_{(a)}$ at a first edge switch $138_{(a)}$ and may be directly forwarded to a second external node $120_{(b)}$ by the first edge switch $138_{(a)}$ without traversing the internal data plane 116. Data packets flow through the data plane 116 according to routes. In some implementations, the routes are determined by the SDN controller 140.

The SDN controller 140 manages the multiple switches of the multi-chassis node 130. In some implementations, the SDN controller 140 is linked to the internal switches 134 and/or the edge switches 138 by a control plane 112. In some implementations, the control plane 112 and the data plane 116 overlap, share links, or are the same physical links. In some implementations, the control plane is wireless. The control plane 112 carries configuration data and control information between the SDN controller 140 and the switches in the multi-chassis node 130. In some implementations, the SDN controller 140 manages each LAG 160, as well as the interface groupings of the edge switches 138 comprising each LAG 160. For example, in some implementations, the SDN controller 140 implements the link aggregation control protocol ("LACP").

In some implementations, a traffic engineering module 150 manages network policy. For example, in some implementations, the traffic engineering module 150 controls traffic policies including, for example, policies for capacity management, resource management, regulation of long-tail traffic flows, and bandwidth allocation. In some implementations, the traffic engineering module 150 determines a maximum bandwidth that may be used by any one flow. In some implementations, the traffic engineering module 150 reserves a minimum bandwidth level for short-burst traffic, e.g., UDP packets. In some implementations, the traffic engineering module 150 manages quality of service (QoS) policies. In some implementations, the traffic engineering module 150 determines TCP window sizes, queue sizes, buffer sizes, and/or other resource allocations. In some implementations, the traffic engineering module 150 is part of the SDN controller 140; in other implementations, the traffic engineering module 150 is distinct from the SDN controller 140. In some implementations, the SDN controller 140 publishes information to the traffic engineering module 150. In some implementations, the information is transmitted using a standard network protocol, e.g., BGP or SNMP. In some implementations, the information is transmitted using a custom protocol.

In some implementations, the SDN controller 140 determines characteristics for each LAG 160. For example, in some implementations, the SDN controller 140 determines the throughput levels for a LAG 160 and, in the event of a failure in one or more links or switches participating in the LAG, adjusts network configurations to reflect and adjust for a resulting impairment. In some implementations, the SDN controller 140 calculates a performance level based on internal link characteristics. For example, in some implementations, the SDN controller publishes a capacity metric value for each LAG, and the SDN controller 140 is able to reduce the published capacity value of an impaired LAG to accurately reflect its capacity to avoid overloading the LAG. In some implementations, the SDN controller 140 modifies internal network routes to maintain communication over portions of an impaired LAG that are still functioning. In some implementations, the SDN can be configured to modify the routes of the impaired LAG to mitigate the impacts of the impairment.

Generally, a failure manifests as a reduction or loss of communication across an internal link in the data plane 116. The problem may be caused by a failure along a particular link, a failure at an internal switch 134, or a failure at an edge switch 138. In some instances, multiple failures may occur.

Figure 2A:
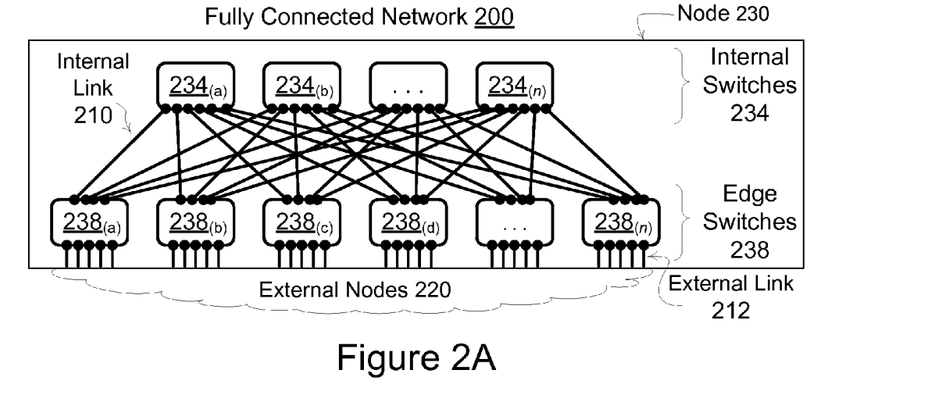
FIGS. 2A and 2B are block diagrams of an example network.
Figure 2B:
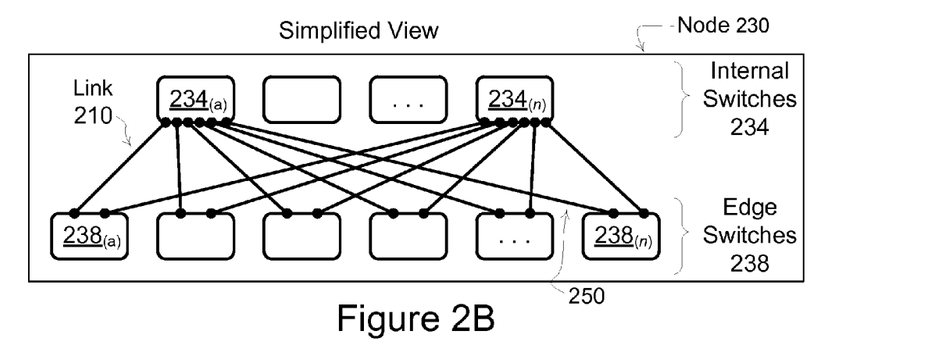

FIGS. 2A and 2B are block diagrams of an example network. FIGS. 2A and 2B illustrate a network 200 that is used in FIG. 2C and FIGS. 3A-3C to illustrate various failure scenarios. FIG. 2A shows a fully connected network 200 within a node 230. The node 230 is an example of a multi-chassis node 130, as shown in FIG. 1. The node 230 includes internal switches 234 and edge switches 238, linked in a substantially folded-Clos configuration. Each internal switch 234 is connected to every edge switch 238, and every edge switch 238 is connected to every internal switch 234, by internal links 210. The edge switches 238 are each connected to one or more external nodes 220 by external links 212. The external nodes are examples of the external nodes 120 shown in FIG. 1, such that the external links 212 participate in link aggregations. FIG. 2B is a simplified view of FIG. 2A; most of the links are removed for clarity. However, it should be understood that all of the links shown in FIG. 2A are assumed in FIGS. 2B, 2C, and 3A-3C.

Figure 2C:
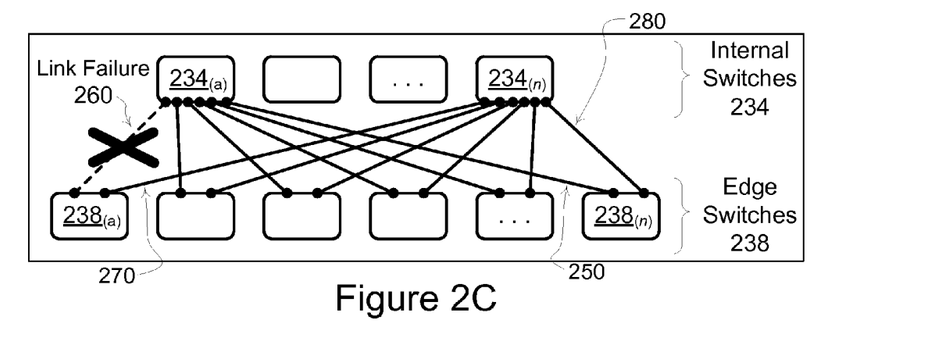
FIG. 2C is a block diagram of an example network with a link failure.

FIG. 2C is a block diagram of an example network with a link failure 260. Referring back to FIG. 2B, data packets may flow from a first edge switch $238_{(a)}$ through any of the internal switches 134 to reach another edge switch $238_{(n)}$. For example, data may flow through a first internal link 210 to an internal switch $234_{(a)}$ to another internal link 250 to the edge switch $238_{(n)}$. In FIG. 2C, the first internal link has failed (indicated by a dashed line 260). Therefore, the aforementioned route is no longer available. Because the edge switch $238_{(a)}$ is linked to every internal switch (as shown in FIG. 2A), there are still routes to the other edge switches 238. For example, data may flow through a second internal link 270 from edge node $238_{(a)}$ to an internal switch $234_{(n)}$, and from there to the edge switch $238_{(n)}$ via another internal link 280. However, the aggregate bandwidth of the internal links is reduced by an amount proportional to the lost link 260. That is, if there are four paths (for example) between edge switches 138, and one is lost, the aggregate bandwidth may be reduced by 25%. A link failure may occur for a variety of reasons. For example, the link itself may be damaged or severed. In some instances, the failure is at one end of the link, e.g., a failure of a network interface.

In some implementations, each internal switch 134 is configured to report status information to an SDN controller 140. For example, in some implementations, an internal switch 134 reports to the SDN controller 140 if a network interface fails. Likewise, in some implementations, each edge switch 138 is similarly configured to report status information to the SDN controller 140. In some implementations, a failure of a single network interface at a switch (either an internal switch 134 or an edge switch 138) is treated as a failure of the entire switch. In some such implementations, the entire switch is removed from routes and can be replaced without further interruption of service.

Figure 3A:
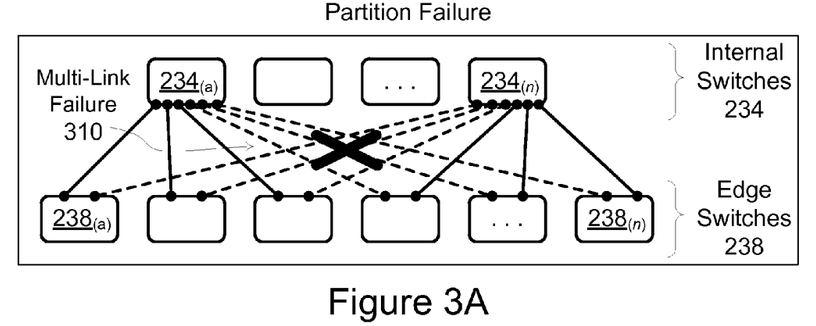
FIG. 3A is a block diagram of an example network partitioned by multiple link failures.

FIG. 3A is a block diagram of an example network partitioned by multiple link failures 310. Multiple link failures add significant complexity to determining link characteristics between edge switches 238. In some instances, one or more failures may cause a partition of the data plane 116, wherein a first operational switch has no possible communication path to at least one other operational switch. In FIG. 3A, there are no routes from a first edge switch $238_{(a)}$ to a second edge switch $238_{(n)}$.

Figure 3B:
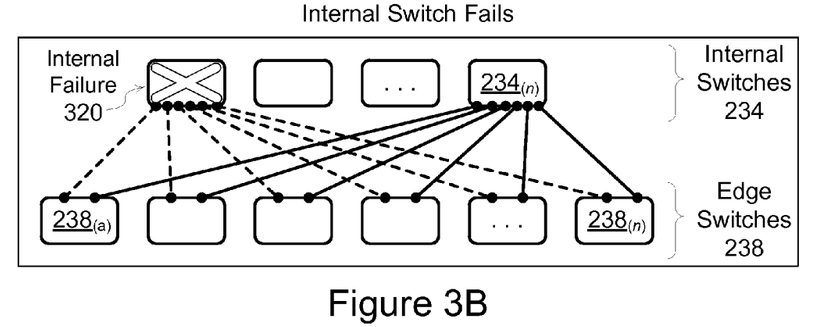
FIGS. 3B and 3C are block diagrams of an example network with a switch failure.
Figure 3C:
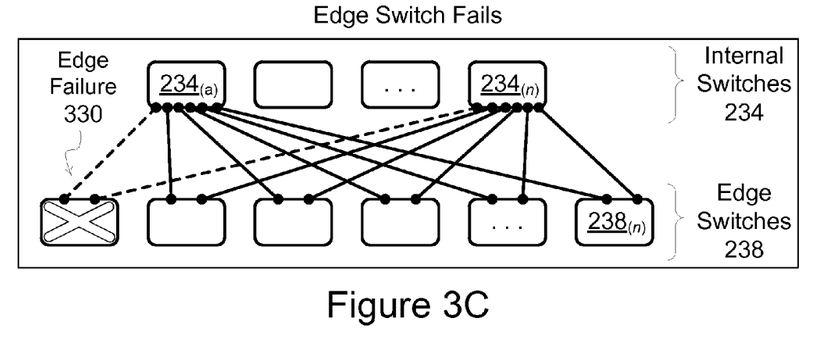

FIGS. 3B and 3C are block diagrams of an example network with a switch failure. Referring to FIG. 3B, an internal switch failure 320 may occur when an internal switch 134 becomes partially or completely non-operational. For example, in some implementations, a failure of a network interface at an internal switch 134 is treated as a failure of the entire internal switch 134. In some implementations, the SDN controller 140 receives a status message from the failed internal switch 134. In some implementations, the SDN controller 140 determines that an internal switch 134 has failed without receiving such a message. For example, in some implementations, the internal switch 134 sends a periodic status message to the SDN controller 140. If the SDN controller 140 does not receive the periodic status message from a particular internal switch 134 within a predetermined length of time, the SDN controller 140 determines that the particular internal switch 134 has failed. In some implementations, the SDN controller 140 sends periodic status request messages to the internal switches 134.

Similarly, referring to FIG. 3C, an edge switch failure 330 may occur when an edge switch 138 becomes partially or completely non-operational. For example, in some implementations, a failure of a network interface (internally facing or externally facing) at an edge switch 138 is treated as a failure of the entire edge switch 138. In some implementations, the SDN controller 140 receives a status message from the failed edge switch 138. In some implementations, the SDN controller 140 determines that an edge switch 138 has failed without receiving such a message. For example, in some implementations, the edge switch 138 sends a periodic status message to the SDN controller 140. If the SDN controller 140 does not receive the periodic status message from a particular edge switch 138 within a predetermined length of time, the SDN controller 140 determines that the particular edge switch 138 has failed. In some implementations, the SDN controller 140 sends periodic status request messages to the edge switches 138.

An internal switch failure 220 or an edge switch failure 230 may resemble multiple link failures. For example, an internal switch failure 220 results in a loss of every link between the failed internal switch 134 and its respective linked edge switches 138. The lost links are illustrated in FIGS. 3A-3C as dashed lines. A switch failure proportionally reduces the capacity of the multi-chassis node 130.

In some implementations, every internal switch 134 in a block of internal switches 134 is linked to every edge switch 138 in a block of edge switches 138, all linked to the same LAG. If each internal switch was configured to provide equal throughput for the LAG, a loss of one internal switch 134 in a block of n internal switches 134 reduces the capacity of that LAG by 1/n. For example, if there are eight internal switches 134 in a block, then losing one diminishes capacity of the LAG by 12.5%. In general, capacity is reduced as a function of the number of internal network interfaces participating in the LAG that are lost.

Figure 4:
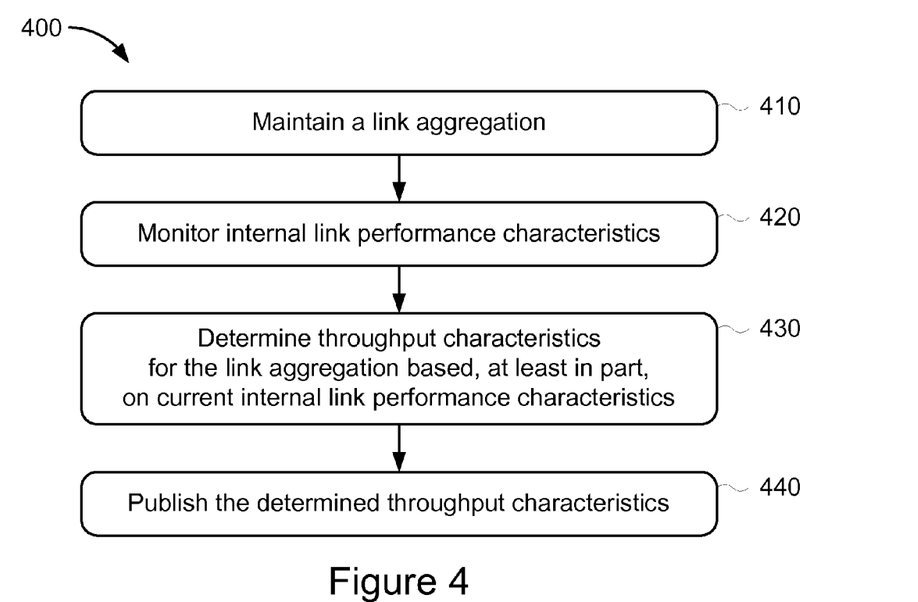
FIG. 4 is a flowchart for a method for monitoring internal link performance characteristics.

FIG. 4 is a flowchart for a method 400 for monitoring internal link performance characteristics. In broad overview, the method 400 begins with a network controller maintaining a link aggregation (stage 410). The network controller monitors internal link performance characteristics of a multi-chassis node participating in the link aggregation (stage 420). The network controller determines throughput characteristics for the link aggregation based, at least in part, on current internal link performance characteristics (stage 430). In some implementations, the network controller publishes the determined throughput characteristics (stage 440).

In more detail, in the method 400, a network controller maintains a link aggregation (stage 410). In some implementations, the network controller, e.g., the SDN controller 140 illustrated in FIG. 1, implements a link aggregation protocol, e.g., the Link Aggregation Control Protocol ("LACP") (See, for example, the IEEE 802.1AX-2008 Standard). In some implementations, the network controller manages a multi-chassis node for a link aggregation ("LAG"). In some implementations, the node participates in multiple LAGs. In some implementations, the network controller maintains information for each flow carried by each LAG connected to the node. In some other implementations, the network controller maintains aggregate information about data flows carried by each LAG.

The network controller monitors internal link performance characteristics (stage 420). The multi-chassis node includes a network fabric made up of internal links connecting edge switches and internal switches. The network controller monitors the performance characteristics of these links. In some implementations, the network controller receives status messages from the switches to monitor performance characteristics of the internal links. In some implementations, the network controller executes network tests, e.g., by sending test packets through the network fabric, and monitors results of the executed network tests. In some implementations, the performance characteristics include whether each particular link is functioning or not functioning, that is, whether each link has failed. In some implementations, the performance characteristics include throughput characteristics such as maximum capacity, current bandwidth usage, explicit congestion indications, average bit rate, and/or latency. In some implementations, the performance characteristics include physical or artificial limitations on traffic flows. For example, in some implementations, internal links are constrained by packet size limitations, windowing, or rate limiters throttling traffic flow artificially.

The network controller determines throughput characteristics for the link aggregation based, at least in part, on current internal link performance characteristics (stage 430). The throughput characteristics of a LAG include the ability of the multi-chassis node to convey data packets to or from the links of the LAG. If the current internal link performance characteristics, as monitored in stage 420, impair data flow to or from the LAG, then the LAG has reduced throughput characteristics even if all external links are operating at full capacity. In some implementations, the network controller calculates a value for a throughput metric related to the LAG. For example, if each internal link contributes to the throughput of a LAG equally, an impairment metric can be calculated as a percentage of the internal links that are considered to be operational. In some implementations, the network controller reduces a published bandwidth of a LAG by an amount proportional to a single internal link when the determined throughput characteristics indicate that a single internal link used by the LAG has failed. In some implementations, if an internally facing network interface fails at a switch, the switch is treated as having failed. As a result, a single internal link failure may be treated as multiple internal link failures.

In some implementations, the network controller publishes the determined throughput characteristics (stage 440). In some implementations, the network controller interacts with a traffic engine, e.g., the traffic engineering module 150 illustrated in FIG. 1. In some such implementations, the network controller provides the traffic engine with information related to the availability of each LAG. In some implementations, the network controller provides the traffic engine with the throughput characteristics determined at stage 430. In some implementations, the network controller publishes the throughput characteristics determined at stage 430 via an interface, e.g., an Application Programming Interface ("API"). In some implementations, the network controller publishes the throughput characteristics determined at stage 430 via a custom protocol. In some implementations, the network controller publishes the throughput characteristics determined at stage 430 by setting status flags. In some implementations, the network controller publishes the throughput characteristics using a flexible standard networking protocol, e.g., the Border Gateway Protocol (BGP) or the Simple Network Management Protocol (SNMP). In some implementations, the network controller publishes the throughput characteristics, generally, to any network recipient.

Figure 5:
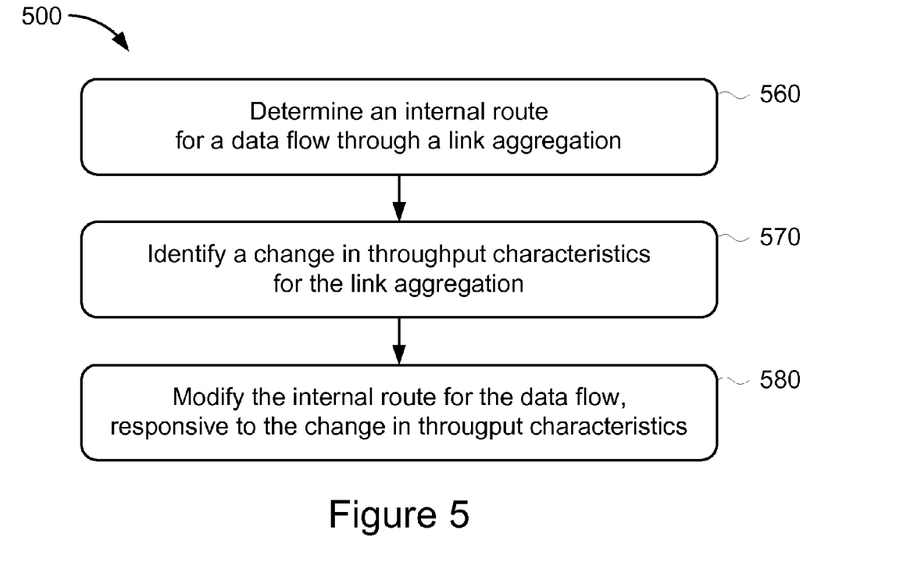
FIG. 5 is a flowchart for a method for modifying internal routes responsive to changes in throughput characteristics.

FIG. 5 is a flowchart for a method 500 for modifying internal routes responsive to changes in throughput characteristics. In broad overview, the method 500 begins with a network controller determining an internal route for a data flow through a link aggregation (stage 560). The network controller identifies a change in throughput characteristics for the link aggregation (stage 570) and modifies the internal route for the data flow, responsive to the change (stage 580).

In more detail, in the method 500 begins with a network controller determining an internal route for a data flow through a link aggregation (stage 560). In some implementations, the network controller is an SDN controller, e.g., the SDN controller 140 illustrated in FIG. 1. The link aggregation (LAG) is a logical grouping of links connected to externally facing network interfaces of one or more edge switches. The network controller determines a route for a data flow through the one or more edge switches. That is, data packets flowing through the LAG are forwarded to or from multiple edge switches according to route information determined by the network controller. The routes may include one or more internal switches and, in some instances, one or more other edge switches. For example, referring to FIG. 1, a data flow from a first external node $120_{(a)}$ to another external node $120_{(n)}$ includes packets arriving at the multi-chassis node 130 via a first LAG 160 and leaving via a second LAG 160. The packets may arrive at different edge switches, e.g., a first edge switch $138_{(a)}$ or a second edge switch $138_{(b)}$. The packets may leave at different edge switches, e.g., a third edge switch $138_{(c)}$ or a fourth edge switch $138_{(n)}$. In some instances, the network controller may distribute a route for the flow across multiple internal switches, e.g., internal switch $134_{(a)}$ and internal switch$_{(b)}$. In some implementations, the network controller determines the internal route for a data flow based on current throughput characteristics for the link aggregation.

Referring to FIG. 5, the method 500 continues with the network controller identifying a change in throughput characteristics for the link aggregation (stage 570). For example, the network controller may detect a link failure (e.g., as illustrated in FIG. 2C) or receive a published notification of network impairment. In some implementations, the network controller detects a particular failure. In some implementations, the network controller is configured to receive specific status notifications regarding links of the data plane 116. For example, referring to FIG. 3B, an internal switch 134 may be configured to periodically report status information to the network controller. When there is an internal failure 320, the failed switch may report the failure, or fail to report at all, to the network controller.

As shown in FIG. 5, the network controller then modifies the internal route for the data flow, responsive to the identified change in throughput characteristics for the link aggregation (stage 580). In some implementations, the change in throughput characteristics for the LAG result from an internal switch 134 failure, e.g., as shown in FIG. 3B. The network controller may respond by altering a flow route to avoid the failed internal switch. For example, referring to FIG. 1, if a network controller is maintaining a route that distributes traffic over internal switch $134_{(a)}$ and internal switch $134_{(b)}$, and if one of the two internal switches fails, the network controller may modify the distributed route to only use the surviving switch. In the network shown in FIG. 1, internal switch $134_{(b)}$ has a link to an edge switch $134_{(a)}$ and internal switch $134_{(a)}$ does not. Thus, if internal switch $134_{(a)}$ fails, there is still a route to edge switch $134_{(n)}$, but if internal switch $134_{(b)}$ fails, there is not. That is, if internal switch $134_{(a)}$ fails, the data flow will be more severely impacted because the edge switch $134_{(n)}$ will also be lost. In some implementations, the network controller accounts for each edge switch and each internal switch that is available for a flow. For example, returning to FIG. 3B, where every edge switch 238 has an internal link to every internal switch 234, an internal switch failure 320 reduces the network's capacity, leaving an impaired but functional network fabric. Similarly, referring to FIG. 3C, an edge switch failure 330 reduces the number of links available to a multi-switch (multi-chassis) LAG. In some implementations, if the throughput characteristics of the surviving switches cannot sustain a flow, the network controller can introduce a rate limiter to throttle the flow to within the capacity of the surviving switches. In some implementations, if the throughput characteristics of the surviving switches cannot sustain a flow, the network controller can terminate the flow.

FIG. 6 is a block diagram of an example software-defined network controller 640 and network device 630 separated by a control plane link 112. In broad overview, the SDN controller 640 includes a control module 642 and memory 646 storing configuration and routing data. The network device 630 includes a control module 644 and memory 636 storing configuration and routing data. The network device 630 includes a forwarding engine 634 that uses the configuration and routing data in memory 636 to manage data traffic at network interfaces $638_{(a)}$-$638_{(n)}$ (generally referred to as network interface 638). The SDN controller 640 is suitable for use as the SDN controller 140 illustrated in FIG. 1. The network device 630 is suitable for use as any of the internal switches 134 or edge switches 138 illustrated in FIG. 1.

Referring to FIG. 6, in more detail, the SDN controller 640 includes a control module 642 and memory 646 storing configuration and routing data. The control module 642 uses the configuration and routing data stored in memory 646 to configure the network device 630. In some implementations, the control module 642 periodically sends a status or availability message to the network device 630. In some implementations, the SDN controller 640 includes additional application modules, not shown. For example, in some implementations, the SDN controller 640 includes a traffic engineering module.

The network device 630 includes a control module 644 and memory 636 storing configuration and routing data. The network device control module 644 receives configuration and routing information from the SDN controller control module 642 (via the control plane 112) and updates the configuration and routing data stored in memory 636.

The network device 630 includes a set of network interfaces 638. Each network interface 638 may be connected to a data plane 116 (as shown in FIG. 1). External devices send data packets to the network device 630, via the data plane 116 and a first network interface (e.g., network interface $638_{(a)}$).

The network device 630 forwards received data packets to an appropriate next-hop via another interface (e.g., network interface $638_{(b)}$). In some implementations, the forwarding engine 634 determines which network interface 638 to use for each data packet received.

The forwarding engine 634 uses the configuration and routing data in memory 636 to manage the data traffic at network interface ports 638. The configuration and routing data in memory 636 are controlled by the SDN controller 640 via the control module 644.

The memory 636 and the memory 646 may each be any device suitable for storing computer readable data. The memory may be similar to the memory 770 illustrated in FIG. 7 and described below. Examples include, but are not limited to, semiconductor memory devices such as EPROM, EEPROM, SRAM, and flash memory devices. In some implementations, the memory 636 of a network device 630 includes one or more ternary content-addressable memory ("TCAM") devices. A network device 630 may have any number of memory devices 636. An SDN controller 640 may have any number of memory devices 646.

FIG. 7 is a block diagram of a computing system for use in implementing the computerized components described herein, in accordance with an illustrative implementation. In broad overview, the computing system includes at least one processor 750 for performing actions in accordance with instructions and one or more memory devices 770 or 775 for storing instructions and data. The illustrated example computing system 710 includes one or more processors 750 in communication, via a bus 715, with at least one network interface controller 720 with network interface ports $722_{(a)}$-$722_{(n)}$ connecting to network devices $712_{(a)}$-$712_{(n)}$, memory 770, and any other devices 780, e.g., an I/O interface. Generally, a processor 750 will execute instructions received from memory. The processor 750 illustrated incorporates, or is directly connected to, cache memory 775.

In more detail, the processor 750 may be any logic circuitry that processes instructions, e.g., instructions fetched from the memory 770 or cache 775. In many embodiments, the processor 750 is a microprocessor unit or special purpose processor. The computing device 710 may be based on any processor, or set of processors, capable of operating as described herein. The processor 750 may be a single core or multi-core processor. The processor 750 may be multiple processors.

The memory 770 may be any device suitable for storing computer readable data. The memory 770 may be a device with fixed storage or a device for reading removable storage media. Examples include all forms of non-volatile memory, media and memory devices, semiconductor memory devices (e.g., EPROM, EEPROM, SRAM, and flash memory devices), magnetic disks, magneto optical disks, and optical discs (e.g., CD ROM, DVD-ROM, and Blu-Ray® discs). A computing system 710 may have any number of memory devices 770.

The cache memory 775 is generally a form of computer memory placed in close proximity to the processor 750 for fast read times. In some implementations, the cache memory 775 is part of, or on the same chip as, the processor 750. In some implementations, there are multiple levels of cache 775, e.g., L2 and L3 cache layers.

The network interface controller 720 manages data exchanges via the network interfaces $722_{(a)}$-$722_{(n)}$. The network interface controller 720 handles the physical and data link layers of the OSI model for network communication. In some implementations, some of the network interface controller's tasks are handled by the processor 750. In some implementations, the network interface controller 720 is part of the processor 750. In some implementations, a computing system 710 has multiple network interface controllers 720.

The network interfaces 722$_{(a)}$-722$_{(n)}$ are connection points for physical network links. In some implementations, the network interface controller 720 supports wireless network connections and an interface port 722 is a wireless receiver/transmitter. Generally, a computing device 710 exchanges data with other computing devices 712$_{(a)}$-712$_{(n)}$ via physical or wireless links to a network interface 722$_{(a)}$-722$_{(n)}$. In some implementations, the network interface controller 720 implements a network protocol such as Ethernet.

The other computing devices 712$_{(a)}$-712$_{(n)}$ are connected to the computing device 710 via a network interface port 722. The other computing devices 712$_{(a)}$-712$_{(n)}$ may be peer computing devices, network devices, or any other computing device with network functionality. For example, a first computing device 712$_{(a)}$ may be a network device such as a hub, a bridge, a switch, or a router, connecting the computing device 710 to a data network such as the Internet.

The other devices 780 may include an I/O interface, external serial device ports, and any additional co-processors. For example, a computing system 710 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 710 includes an additional device 780 such as a co-processor, e.g., a math co-processor can assist the processor 750 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system comprising:
   a multi-chassis network node comprising:
   a plurality of edge network devices, each having a plurality of externally facing network interfaces and a plurality of internally facing network interfaces;
   a set of internal switch devices; and
   a plurality of internal network links coupling each edge network device to at least a subset of the set of internal switch devices; and
   a network controller coupled to the multi-chassis network node, the network controller configured to:
   maintain a link aggregation (LAG) comprising a logical grouping of externally facing network interfaces across at least two of the plurality of edge devices for communication between the multi-chassis network node and a second network node;
monitor performance characteristics of the internal network links in the multi-chassis network node;
determine throughput characteristics for the LAG over time based at least in part on current internal link performance characteristics; and
make the determined throughput characteristics for the LAG available to another network device external to the multi-chassis network node.

2. The system of claim 1, wherein the network controller is further configured to determine a set of routes for data through the plurality of internal network links for communication with the LAG based on the monitored performance characteristics of the internal network links in the multi-chassis network node.

3. The system of claim 1, wherein the network controller is configured to make the determined throughput characteristics available to a computing device executing a traffic engineering module.

4. The system of claim 1, wherein the network controller is configured to reduce a published bandwidth of the LAG by an amount proportional to a single internal link when the determined throughput characteristics indicate that a single internal link used by the LAG has failed.

5. The system of claim 1, wherein, in response to the network controller determining that at least one internally facing network interface of a given edge device has failed, the network controller is configured to reduce the determined throughput characteristics of the LAG proportional to a count of network interfaces of the given edge device that are in the logical grouping for the LAG.

6. The system of claim 1, wherein at least one of the edge devices and the internal switch devices are configured to transmit information to the network controller indicating the current performance characteristics of internal links coupling to the respective devices.

7. The system of claim 1, wherein at least one of the edge devices and the internal switch devices are configured to transmit information to the network controller indicating the current performance characteristics of its respective network interfaces.

8. The system of claim 1, wherein the network controller maintains the LAG according to a multi-chassis link aggregation protocol.

9. The system of claim 1, wherein the network controller maintains a first LAG comprising a first logical grouping of externally facing network interfaces of at least a first edge device and the network controller maintains a second LAG comprising a second logical grouping of externally facing network interfaces of at least the first edge device, the second logical grouping distinct from the first logical grouping.

10. The system of claim 1, wherein the internal network links of the multi-chassis network node couple the edge network devices and the internal switch devices substantially in a folded-Clos configuration.

11. A method comprising:
maintaining, by a network controller coupled to a multi-chassis network node, a link aggregation (LAG) comprising a logical grouping of externally facing network interfaces across at least two of a plurality of edge devices in the multi-chassis network node for communication between the multi-chassis network node and a second network node;
monitoring, by the network controller, performance characteristics of a plurality of internal network links coupling the plurality of edge devices to internal switch devices in the multi-chassis network node; and
determining, by the network controller, throughput characteristics for the LAG over time based at least in part on current internal link performance characteristics; and
making the determined throughput characteristics for the LAG available to another network device external to the multi-chassis network node.

12. The method of claim 11, comprising determining a set of routes for data through the plurality of internal network links for communication with the LAG based on the monitored performance characteristics of the internal network links in the multi-chassis network node.

13. The method of claim 11, comprising making the determined throughput characteristics available to a computing device executing a traffic engineering module.

14. The method of claim 11, comprising reducing a published bandwidth of the LAG by an amount proportional to a single internal link when the determined throughput characteristics indicate that a single internal link used by the LAG has failed.

15. The method of claim 11, the method comprising:
determining, by the network controller, a failure condition wherein at least one internally facing network interface of a given edge device has failed; and
reducing, in response to determining the failure condition, the determined throughput characteristics of the LAG proportional to a count of network interfaces of the given edge device that are in the logical grouping for the LAG.

16. The method of claim 11, wherein at least one of the edge devices and the internal switch devices are configured to transmit information to the network controller indicating the current performance characteristics of the internal links.

17. The method of claim 11, wherein at least one of the edge devices and the internal switch devices are configured to transmit information to the network controller indicating the current performance characteristics of the network interfaces.

18. The method of claim 11, wherein the network controller maintains the LAG according to a multi-chassis link aggregation protocol.

19. The method of claim 11, wherein the network controller maintains a first LAG comprising a first logical grouping of externally facing network interfaces of at least a first edge device and the network controller maintains a second LAG comprising a second logical grouping of externally facing network interfaces of at least the first edge device, the second logical grouping distinct from the first logical grouping.

20. A tangible computer readable storage media storing non-transitory processor-executable instructions that, when executed by a computing device comprising the storage media and one or more processors coupled to a switch fabric in a multi-chassis network node, cause the one or more processors to perform the operations of:
maintaining a link aggregation (LAG) comprising a logical grouping of externally facing network interfaces across at least two of a plurality of edge devices in the multi-chassis network node for communication between the multi-chassis network node and a second network node;
monitoring performance characteristics of a plurality of internal network links coupling the plurality of edge devices to internal switch devices in the multi-chassis network node; and
determining throughput characteristics for the LAG over time based at least in part on current internal link performance characteristics; and making the determined throughput characteristics for the LAG available to another network node external to the multi-chassis network node.

\* \* \* \* \*